May 26, 1964 M. M. JALMA 3,134,826
GAS AND LIQUID CONTACT APPARATUS
Filed Oct. 28, 1960
2 Sheets-Sheet 1

MICHAEL M. JALMA
*INVENTOR.*

BY *Albert Sperry*
ATTORNEY

May 26, 1964   M. M. JALMA   3,134,826
GAS AND LIQUID CONTACT APPARATUS
Filed Oct. 28, 1960   2 Sheets-Sheet 2

MICHAEL M. JALMA
INVENTOR.

BY Albert Sperry
ATTORNEY

United States Patent Office 3,134,826
Patented May 26, 1964

3,134,826
GAS AND LIQUID CONTACT APPARATUS
Michael M. Jalma, 410 Brookside Place, Cranford, N.J.
Filed Oct. 28, 1960, Ser. No. 65,832
4 Claims. (Cl. 261—29)

This invention relates to gas and liquid contact apparatus and is directed particularly to equipment for scrubbing gases whereby undesired or valuable constituents may be removed from the gases. This application is a continuation-in-part of my co-pending application Serial No. 687,491, filed October 1, 1957 and now abandoned.

In my issued Patent No. 2,756,976 I have shown and described a type of gas scrubber wherein the gases to be cleaned pass inwardly through perforations in the wall of a chamber while liquid is being circulated over the inner surfaces of said walls. Such equipment has proven very effective in use. However, it is not readily applicable to small installation and considerable power is required to insure the desired circulation of the liquid within the chamber.

In accordance with the present invention, a scrubber for gases is provided which may be made in either small or large sizes depending upon the volume of the gases to be handled and the nature of the impurities to be removed therefrom. Moreover, the amount of power required to operate the equipment is reduced, whereas the various elements of the equipment may be economically produced and assembled to provide an inexpensive but efficient gas scrubber.

These advantages are preferably attained by providing a gas chamber having inlet and outlet openings with a rotatable perforated drum into which the gas to be cleaned is introduced. A stationary shell is also located within the chamber and about the rotatable drum and is formed with a perforated surface concentric with the drum through which the gas flows to the outlet from the chamber. Liquid for cleaning the gases is circulated and largely confined in the space between the rotary drum and the stationary shell whereby the gas flows outward from the drum and into and through a circulating curtain or body of liquid established about the exterior of the drum. In this way the gas and liquid are brought into positive and effective cleaning contact during their passage through the chamber. Furthermore, the rotatable drum is preferably formed with surfaces adjacent the openings therein which serve as impelling means to aid in propelling the gas and liquid outward from the drum through the stationary shell whereby back pressure on the gases is reduced and in at least some instances, a suction effect may be created which aids in drawing the gases into and forcing them through the equipment.

The principal objects of the present invention are to provide a novel type of gas scrubber which is capable of use in either large or small installations, having a simplified construction thereby reducing the costs of operating gas and liquid contact apparatus, reducing the back pressure and increasing the effectiveness of the contact between gases and the liquids in a scrubber.

A specific object of the invention is to provide a scrubber for gases wherein a perforated drum is rotated within a concentric stationary shell which is also perforated and cooperates with the drum in maintaining a circulating body of cleaning liquid about the exterior of the drum while the gas is caused to flow through the liquid as it passes from a gas inlet to a gas outlet.

These and other objects and features of the present invention will appear from the following description thereof wherein reference is made to the figures of the accompanying drawings.

Figure 1:
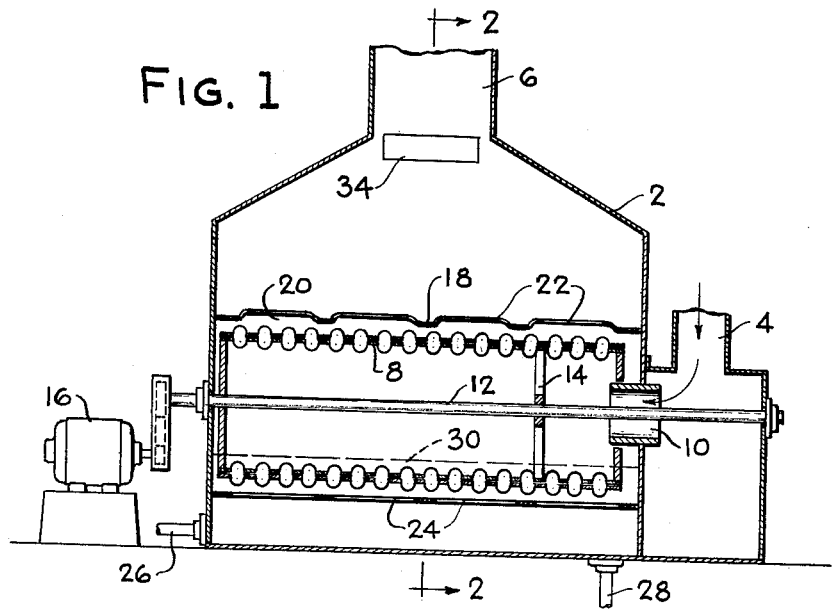
FIG. 1 is a vertical sectional view through a typical form of gas scrubber embodying the present invention.
Figure 2:
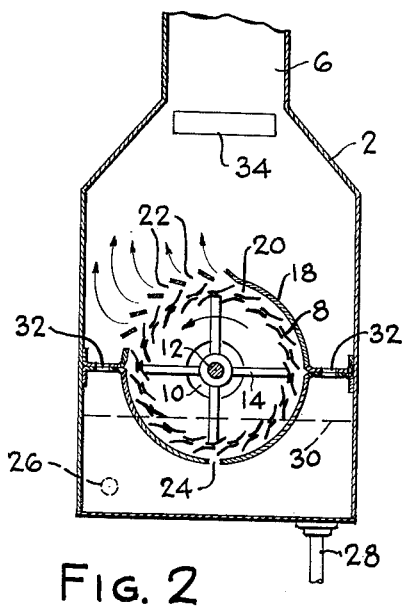
FIG. 2 is a vertical sectional view of the scrubber shown in FIG. 1 taken on the line 2—2 thereof.

In that form of the invention chosen for purposes of illustration in FIGS. 1 and 2, the gases to be cleaned are caused to enter a chamber 2 through an inlet 4, whereas the cleaned or scrubbed gases are discharged from the chamber 2 through an outlet 6. The gases entering the chamber are directed from the inlet 4 into the interior of a perforated cylinder, drum or rotor 8 through an opening 10 adjacent one end of the drum. The drum 8 is located in the lower portion of the chamber 2 and is mounted for rotation about its axis. For this purpose, the drum 8 may be secured to a shaft 12 by a spider or arms 14, whereas the shaft 12 may be driven by suitable means such as a motor 16.

A stationary casing or shell 18 is mounted within the chamber 2 in substantially concentric relation with respect to the rotatable drum 8 and cooperates therewith to provide a scrubbing space 20 therebetween through which a cleaning liquid is circulated as the drum 8 revolves about its axis. The shell 18 is provided with upper discharge openings 22 through which the cleaned gases and a portion of the cleaning liquid may issue into the chamber 2. The lower portion of the shell 18 is provided with liquid inlet openings 24 through which water or other cleaning liquid may enter the scrubbing space 20 between the shell and drum. Water or other cleaning liquid is supplied to the lower portion of the chamber 2 through an inlet pipe 26 and may be drawn off from the chamber through an outlet pipe 28.

Figure 3:
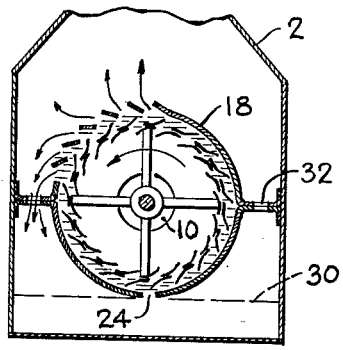
FIG. 3 is a diagrammatic illustration showing the action of the construction illustrated in FIGS. 1 and 2.

The normal level of the liquid in the chamber 2 when the drum 8 is not being rotated may be at or about the level indicated by dotted line 30 in FIG. 2. However, when the drum is rotated the cleaning liquid in contact with the outer surface thereof is carried upward on the exterior of the drum and into the upper portion of the scrubbing space 20 between the drum and the stationary shell 18. At the same time the liquid within the drum is expelled outward from the interior thereof into the scrubbing space 20 so that said space is substantially filled with a circulating body of cleaning liquid as shown in FIG. 3. As the drum 8 rotates, the liquid on its outer surface naturally tends to fly outward tangentially away from the drum and if not restricted would create a spray throughout the upper portion of the chamber 2 as in prior spray type gas scrubbers. However, the shell 18 surrounding the drum prevents the liquid from being sprayed outward or dispersed into droplets. The shell 18 serves instead to restrict and confine the liquid as it impinges on the inner surface of the shell. In this way the stationary shell and the rotor or revolving drum cooperate to create and maintain a vigorously circulating curtain or body of liquid about the outer surface of the drum which may substantially fill the scrubbing space 20 between the drum and the shell. The gases thus are brought into direct and positive contact with the circulating liquid and are caused to pass through a continuously maintained body of liquid instead of merely being subjected to a fog or shower of liquid as has been usual when employing rotary members in gas scrubbers heretofore.

The drum or rotor 8 is preferably provided with a large number of small openings in its surface so that the gases issuing outward from the interior of the drum 8 are broken up into a multitude of finely divided streams of gas which are projected into and through the circulating washing liquid in the scrubbing space 20. After passing through the liquid curtain, the gases are expelled through the discharge openings 22 into the upper portion of the chamber 2. At the same time considerable amounts of the cleaning liquid are also discharged through the outlets 22 and return to the lower portion of the chamber through channels 32 where they re-enter the scrubbing space through the liquid inlet openings 24 in the bottom of the shell 18.

The scrubbed or cleaned gases issuing from the discharge openings in the shell 18 pass upward to the outlet 6 and if desired, a mist eliminator 34 may be located in the upper portion of the chamber 2 to remove any entrained droplets or excess liquid from the gases leaving the equipment.

Figure 4:
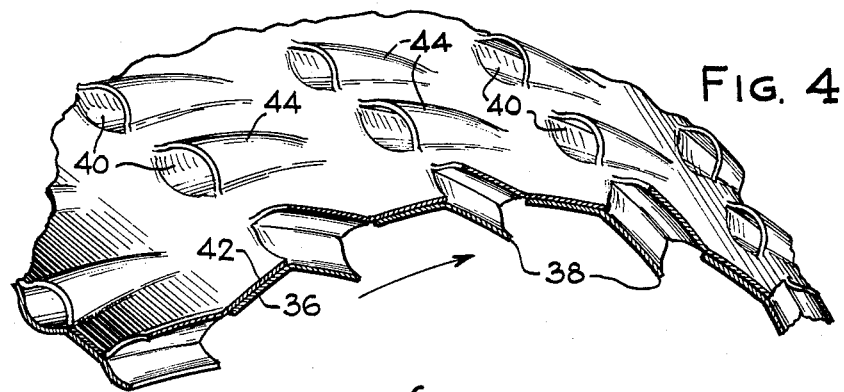
FIG. 4 is a detail view illustrating a portion of a preferred type of rotatable drum which may be employed in the construction of FIGS. 1, 2 and 3.

In order to aid in the circulation of the gases and water through the equipment, the drum 8 is preferably constructed as shown in FIG. 4. For this purpose an inner member 36 is provided with a plurality of vanes or inclined surfaces 38 which slope outward toward openings 40 in an outer member 42 of the drum. The outer member of the drum has the openings 40 therein aligned with the deflecting surfaces 38 so as to receive gases and liquids therefrom. At the same time the outer surface of the outer member 42 is formed with outwardly inclined deflectors 44 which serve to direct the openings 40 in the drum substantially tangentially and opposite to the direction of rotation of the drum. The deflectors 44 further aid in forcing the gases outward through the circulating curtain of cleaning liquid in the scrubbing space 20.

The construction thus provided acts as an impeller to force the gases outward from within the drum when the drum rotates in the direction indicated by the arrows in FIGS. 2, 3, and 4. In this way back pressure is reduced and the gases are drawn into the equipment. At the same time the construction serves to create a multitude of tangentially directed jets through which the gases issue from the drum in relatively finely divided streams into the circulating scrubbing liquid in the scrubbing space 20. The gases and liquid are thereby brought into intimate and effective cleaning contact which insures the removal of foreign or undesired or valuable constituents carried by the gases.

Figure 5:
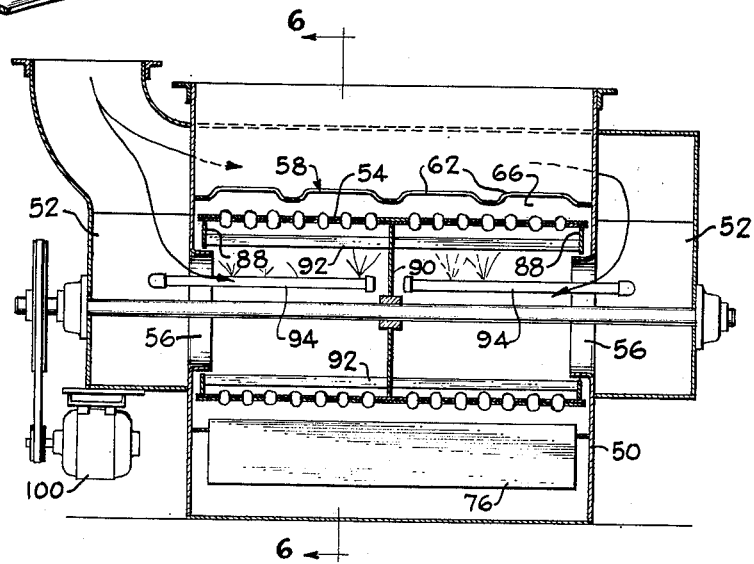
FIG. 5 is a vertical sectional view through an alternative form of scrubber embodying the present invention.
Figure 6:
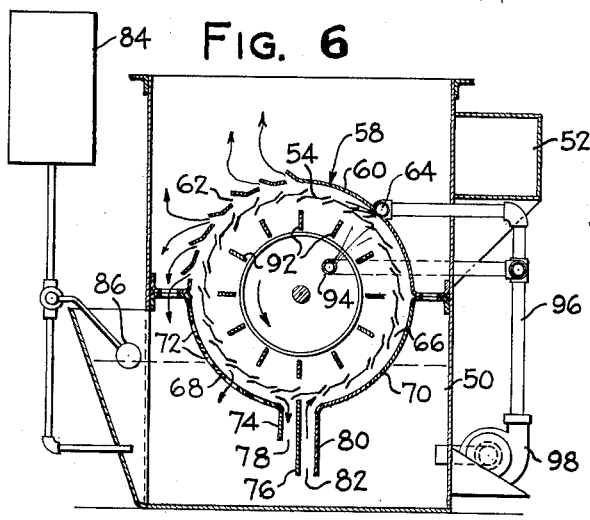
FIG. 6 is a vertical sectional view taken on the line 6—6 of FIG. 5.

In the alternative form of the invention shown in FIGS. 5 and 6, the equipment is provided with a chamber 50 having inlets 52 for the gases to be scrubbed which are located at opposite sides of the chamber 50 and communicate with the opposite ends of the drum 54 through the openings 56. A stationary casing or shell 58 is mounted within the chamber and surrounds the drum 54. The upper portion 60 of the stationary casing is formed with gas discharge openings 62 which in some instances are confined to the upper quarter of the casing and are inclined tangentially with respect to the drum to limit or prevent liquid from being projected radially outward from the drum as it rotates.

The opposite upper quarter of the portion 60 of the casing is provided with one or more liquid supply means 64 which preferably are slotted lengthwise of the drum so as to introduce water or cleaning liquid into the scrubbing space 66 between the drum and casing in the form of sheets or curtains of liquid which are projected approximately tangentially against the exterior of the drum and travel with the drum while serving to maintain the scrubbing space substantially filled with a circulating body of liquid. While in practice three such nozzles or liquid supply means are generally employed to insure filling of the scrubbing space with liquid, only one nozzle is illustrated for purposes of simplicity in the drawing. The injecting of liquid tangentially from the nozzle 66 against the drum serves to direct the liquid toward the opening 40 in the drum and against the jets of gas issuing from the openings 40. This not only increases the turbulence of the gas and liquid within the scrubbing space 66 but also serves to dislodge any solid matter which might tend to clog the openings 40.

The lower portion of the casing 58 embodies two portions shown at 68 and 70. The portion 68 is provided with openings 72 through which liquid may return to the lower portion of the chamber 50. The lower edge of the portion 68 further is provided with a downwardly turned flange 74 that is spaced from a vertically extending baffle 76. The upper edge of the baffle projects into close proximity with the surface of the drum 54 so that the baffle cooperates with the flange 74 to provide a liquid return passage 78 for directing liquid from the scrubbing space 66 downwardly into the lower portion of chamber 50.

The portion 70 of the casing is imperforate and is provided at its lower edge with a downwardly extending flange 80 which projects into the liquid in the bottom of chamber 50. The baffle 76 also extends downward into the liquid in the chamber and thus cooperates with flange 80 to form a liquid inlet passage 82 leading from the bottom of the chamber to the scrubbing space 66.

The liquid to be employed in the scrubbing operation is supplied from a suitable source such as the container 84 and is maintained at the desired level above the lower portion of the drum 54 by means of a float ball 86 or other suitable means.

The drum 54 is perforated and preferably is constructed with tangentially inclined passages as shown at 40 in FIG. 4. It is open at its opposite ends to receive the gases to be scrubbed through the openings 56. The opposite ends of the perforated shell of the drum are supported by the rings 88. When the rotor is relatively long, or in any case when it is desired to assure balanced operation and cause the gases to flow outward uniformly through the perforations of the drum, the drum may be provided with a central partition 90 dividing the interior of the drum into two relatively short sections.

It is also preferable to provide the drum with a plurality of radially directed vanes 92 which are supported by the end rings 88 and the partition 90 and serve as impellers to aid in forcing the gases radially outward through the perforations in the shell of the drum. The vanes 92 extend lengthwise of the drum and have the outer edges thereof spaced from the inner surface of the drum so as to permit free passage of the gases to be scrubbed to and through the perforations in the drum.

It is also found desirable in some instances to project jets of water or cleaning liquid against the inner surface of the drum. For this purpose liquid may be circulated through the pipes 94 which extend in through the openings 56 in the chamber and into the ends of the drum. The jets of liquid are particularly useful when the gases being scrubbed contain tarry matter or other material which might collect on the interior of the drum or clog the perforations therein.

The water or cleaning liquid used is circulated from the bottom of the chamber 50 through the pipe 96 by pump 98 which forces the liquid through liquid supply means or nozzles 64 and into the scrubbing space 66. At the same time the drum is rotated in a counter-clockwise direction as seen in FIG. 6 by a motor 100.

Since the lower portion of the drum 54 dips into the liquid in the chamber 50 the rotation of the drum serves to pick up and carry the liquid through the scrubbing space. Therefore, the drum functions as a pumping means to draw liquid upward from the bottom of chamber 50 through the inlet passage 82 into contact with the outer surface of the drum. The space enclosed by the portion 70 of the stationary casing therefore will be substantially filled with water or cleaning liquid at all times. This supply of liquid is supplemented by the jets of liquid from the nozzles 64 so that the closed portion of the scrubbing space, which as shown may extend throughout nearly half the circumference of the drum, is substantially filled with liquid circulating vigorously about the outer surface of the drum. Moreover, the liquid is confined adjacent the surface of the drum by the stationary casing so that it is maintained on the surface in the form of a continuous circulating curtain or body of liquid through which the gases to be scrubbed must pass.

The impeller vanes 86 force the gases outward through the perforations in the drum and through the body of liquid to the gas discharge openings 62. Moreover, the inclined formation of the openings 40 in the drum as shown in FIG. 4 aid in projecting the gases outward. The gases, therefore, are forced through the circulating body of liquid in the form of a multitude of fine streams, jets or bubbles so as to issue from the discharge openings 62 in the stationary casing into the upper portion of the chamber 50.

The circulating liquid is returned to the lower portion of the chamber through the openings 72 and the return passage 77. Since the lower edge of the baffle 76 extends into the liquid maintained in the chamber, the baffle serves as a barrier to confine any light floating material on the left hand side of the baffle as seen in FIG. 6. Therefore, it may be skimmed off easily from time to time and removed from the system. On the other hand, heavy material may accumulate in the bottom of the chamber below the lower end of the inlet passage 82 so that the liquid returned to the scrubbing space from the lower portion of the chamber 50 will be relatively clean.

Figure 7:
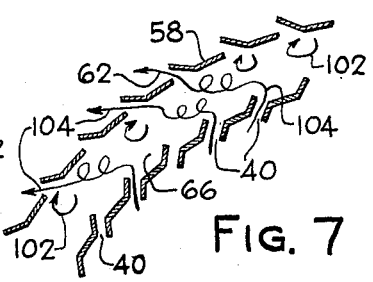
FIG. 7 is a diagram illustrating the action of equipment embodying the present invention.

In each of the forms of the invention, the stationary shell extends about at least the upper half of the drum and preferably extends about the major portion of the periphery of the drum in position to prevent the liquid from being sprayed outward away from the drum. The liquid is thereby confined and retained on the surface of the drum so that the scrubbing space is substantially filled with liquid. As a result, the gases are projected through the liquid instead of projecting the liquid through the gases as has been usual heretofore. It is not only possible to maintain a circulating body of liquid on the exterior of the drum but a rolling motion as represented by the arrows 102 in FIG. 7 is imparted to the liquid in the scrubbing space 66 due to the relative motion of the drum 54 with respect to the stationary casing. The bubbles or jets of gas passing through the perforations 40 in the drum therefore are caught up and intermingled with the liquid and are subjected to violent rotation or turbulence as represented by the arrows 104 in FIG. 7. In this way, most intimate contact of the liquid and gases is assured. The gases are, accordingly, scrubbed with greater effectiveness than would be possible if the liquid were unconfined and could be discharged outwardly away from the drum as in the usual type of spray type gas scrubber.

The action and efficiency of operation of equipment embodying the present invention will vary considerably depending upon the conditions of operation and dimensional relations of the elements. Thus, the spacing of the shell from the drum and the speed of rotation of the drum as well as the number, form and arrangement of the openings in the drum and the gas discharge openings in the shell may be varied considerably depending upon the size of the equipment and the nature, temperature and pressure of the gases being scrubbed.

In general, it is desirable to rotate the drum in a manner to insure a surface speed of at least 300 feet per minute and the surface speed may be 1000 feet per minute or more. The diameter of the drum used in any installation has an important influence on the operation in that the radius of curvature of the drum and its speed of rotation largely determine the amount of liquid picked up and carried by the drum into the scrubbing space between the rotating drum and the stationary shell. The cross section of the scrubbing space also may vary, but in order to establish and maintain a body of liquid in the scrubbing space, the drum and shell ordinarily should be spaced apart a distance equal to from about 2 to 10 percent of the diameter of the drum but not less than about ½ inch nor more than about 2 inches.

The elements employed in the manufacture of equipment embodying the present invention are simple and economical to manufacture and lend themselves to use in constructions varying greatly in size and capacity. Thus, small units may be employed in household or domestic installations for room air conditioning and odor elimination, or they may be used on incinerators as smoke eliminators or on trucks and engines for the removal of fumes and noxious gases or vapors. At the same time the construction has endless industrial applications for scrubbing stack gases and eliminating objectionable or dangerous constituents thereof or for the recovery of valuable products contained in industrial gases or fumes.

It will, therefore, be apparent that the present invention is capable of many changes and modifications in the form, construction and arrangement of the elements of the combination and in the manner of operation thereof. Accordingly, it should be understood that the particular embodiments of the invention which have been shown in the drawings and described above are intended to be illustrative only and are not intended to limit the scope of the invention.

I claim:

1. Gas scrubbing apparatus comprising means forming a chamber, a drum located in the lower portion of said chamber and having an open end for receiving gases to be scrubbed, means to rotatably mount said drum for rotation about a horizontal axis, means for rotating said drum about said axis and in a predetermined direction, liquid level control means operable to maintain a body of liquid in the lower portion of said chamber at a level sufficient to continuously contact the lower portion of said drum during rotation thereof, gas inlet means communicating with said chamber and arranged to direct gases to be scrubbed into said drum through said open end of the drum, stationary wall means in said chamber of substantially cylindrical shape concentric with said drum and surrounding said drum in closely spaced relation with respect to the drum and extending throughout the major portion of the circumference of the drum to define a space between the drum and stationary wall means, said stationary wall means having openings therein located above the level of the liquid maintained in the lower portion of said chamber for the passage of gas outward from the space between the drum and stationary wall means, said drum having a plurality of openings therein distributed throughout the surface of the drum, said openings in the drum each having one side thereof defined by a portion of said drum which projects inwardly from the inner surface of the drum and is inclined in said predetermined direction of rotation of the drum to direct gas outward from the interior of the drum through said openings and into the space between the drum and stationary wall means when the drum is rotated in said predetermined direction, the opposite sides of each of said openings in the drum being defined by a portion of the drum which projects outwardly from the outer surface of the drum and is inclined in a direction opposite to the predetermined direction of rotation of the drum to promote the movement of gases passing through said opening in the drum outward through the space between the drum and stationary wall means to the openings in said stationary wall means and to carry liquid in contact with said lower portion of said drum upwardly into said space between said drum and said wall means to substantially fill said space with a flowing body of liquid through which the gases pass in travelling from the openings in the drum to the openings in the stationary wall means when said drum is rotated, gas outlet means communicating with said chamber, said gas outlet means being spaced from said stationary wall means and communicating with the openings in said stationary wall means for the passage of gas through said chamber from the openings in said stationary wall means to said gas outlet means.

2. Gas scrubbing means as defined in claim 1 wherein additional liquid supply means communicate with the space between the drum and stationary wall means at a point above the level of the liquid maintained in the lower portion of said chamber.

3. Gas scrubbing means as defined in claim 1 wherein additional liquid supply means communicate with the space between the drum and stationary wall means at a point above the level of the liquid maintained in the lower portion of said chamber, and other liquid supply means are positioned within said drum and direct liquid against the upper inner surface of the drum.

4. Gas scrubbing apparatus as defined in claim 1 wherein the openings in the stationary wall means are in the form of slots extending substantially parallel to the axis of rotation of said drum and are located in an upper quadrant of the stationary wall means.

References Cited in the file of this patent

UNITED STATES PATENTS

| | | |
|---|---|---|
| 704,593 | Theisen | July 15, 1902 |
| 1,319,667 | Kraut et al. | Oct. 21, 1919 |
| 1,322,909 | Kraut | Nov. 25, 1919 |
| 2,066,913 | Schmeig | Jan. 5, 1937 |
| 2,120,601 | Delamere | June 14, 1938 |
| 2,212,752 | Schmeig | Aug. 27, 1940 |
| 2,793,710 | Robinson | May 28, 1957 |
| 2,889,005 | Umbricht | June 2, 1959 |

FOREIGN PATENTS

| | | |
|---|---|---|
| 13,207 | France | Dec. 5, 1910 |
| | (1st Addition of 404,336) | |
| 107,705 | Sweden | June 22, 1943 |
| 682,162 | Germany | Oct. 9, 1939 |